INVENTOR.
HERBERT C. BIBLE

Nov. 4, 1958  H. C. BIBLE  2,858,864
SLICING MACHINE
Filed May 16, 1957  2 Sheets-Sheet 2
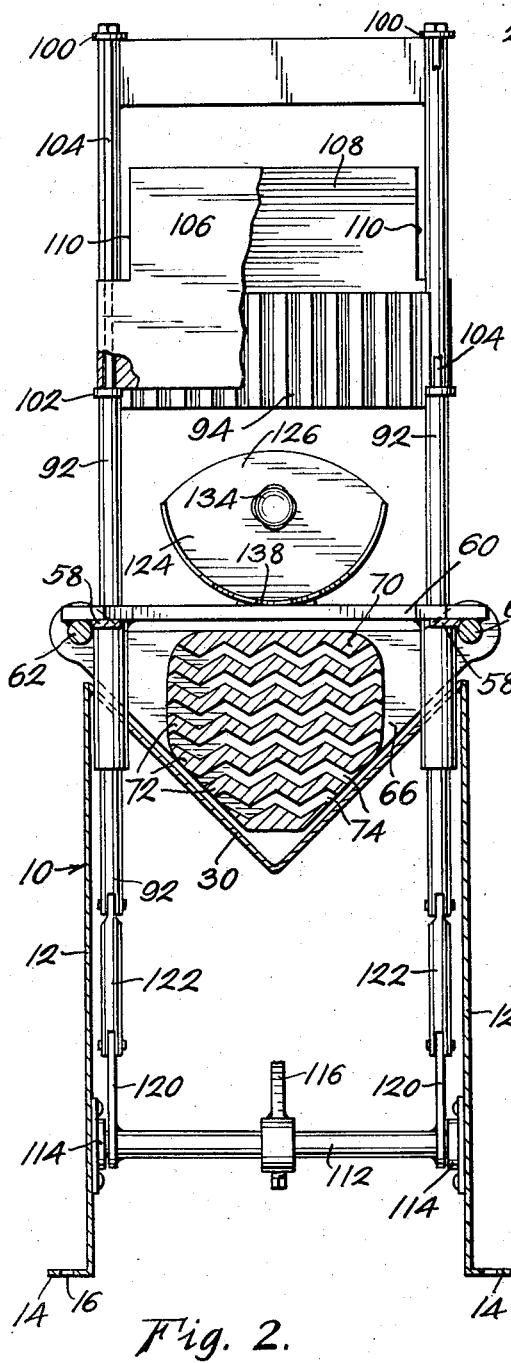
Fig. 2.
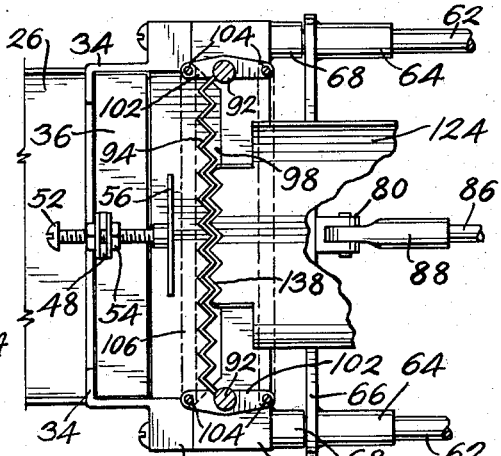
Fig. 3.
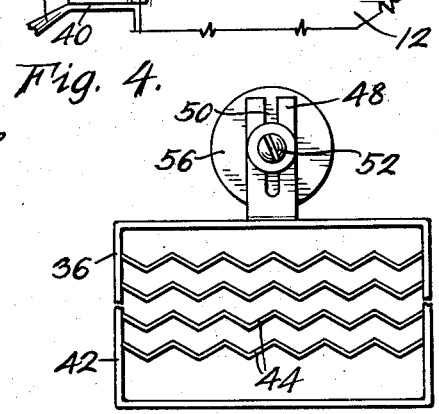
Fig. 4.
Fig. 5.
INVENTOR.
HERBERT C. BIBLE
BY
ATTORNEY

United States Patent Office

2,858,864
Patented Nov. 4, 1958

---

2,858,864

SLICING MACHINE

Herbert C. Bible, Casper, Wyo.

Application May 16, 1957, Serial No. 659,671

20 Claims. (Cl. 146—78)

This invention relates to slicing devices and, more particularly, to vegetable slicing machines.

Many canneries and other establishments of a similar nature, of course, are equipped with machines which will slice, dice and otherwise cut fruits and vegetables into a form suitable for canning and packaging. These machines are expensive, complicated and designed for large volume production which precludes their use in the home or restaurant.

On the other hand, however, the housewife and restaurateur often require a better method of producing French fried potatoes, sliced vegetables and sliced fruits than that provided by the slow but conventional hand-slicing methods. Restaurants, in particular, have need of a simple and inexpensive machine for slicing various fruits and vegetables into elongated slices having a form similar to that customarily associated with French fried potatoes.

It has also been found that fruits and vegetables sliced into an elongated form having a generally rectangular cross section but sides with a corrugated or scalloped surface present a more decorative and appetizing appearance to the guest in the home or patron of the restaurant. This form further provides an increased surface area that is particularly desirable in fried foods which are largely surface-cooked especially when fried in deep fat.

It is, therefore, the principal object of the present invention to provide a fruit and vegetable slicing machine which, although hand-operated, produces a volume much greater than purely hand slicing methods and is, therefore, ideally suited for use in the home and restaurant.

A second object of the invention is the provision of a slicing machine that will cut a whole vegetable or fruit into a plurality of elongated sliced segments with but two simple manual movements that can be performed quite rapidly.

A third object is to provide a slicing machine which produces sliced fruits and vegetables having uniform cross section and wavy or corrugated surfaces that are decorative and give the slice a large surface area for a given mass.

Another object of the invention is to provide a vegetable slicer which is sanitary and easily cleaned following use.

Further objects are to provide a slicing machine which is simple, inexpensive, easy to operate, compact and adaptable to use with a wide variety of vegetables and fruits of various sizes and shapes.

Other objects will be in part apparent and in part pointed out specifically hereinafter in connection with the description of the drawing that follows, in which:

Figure 2 is a vertical section taken along line 2—2 of Figure 1 with certain portions broken away to expose the interior construction;

Figure 3 is a fragmentary transverse section taken along line 3—3 of Figure 1 showing the vertical cutter and feed mechanism in detail;

Figure 4 is a fragmentary side elevation showing the means for reciprocating the horizontal cutter in detail; and, Figure 5 is a front elevation of the horizontal cutter, portions of which have been broken away to conserve space.

Figure 1:
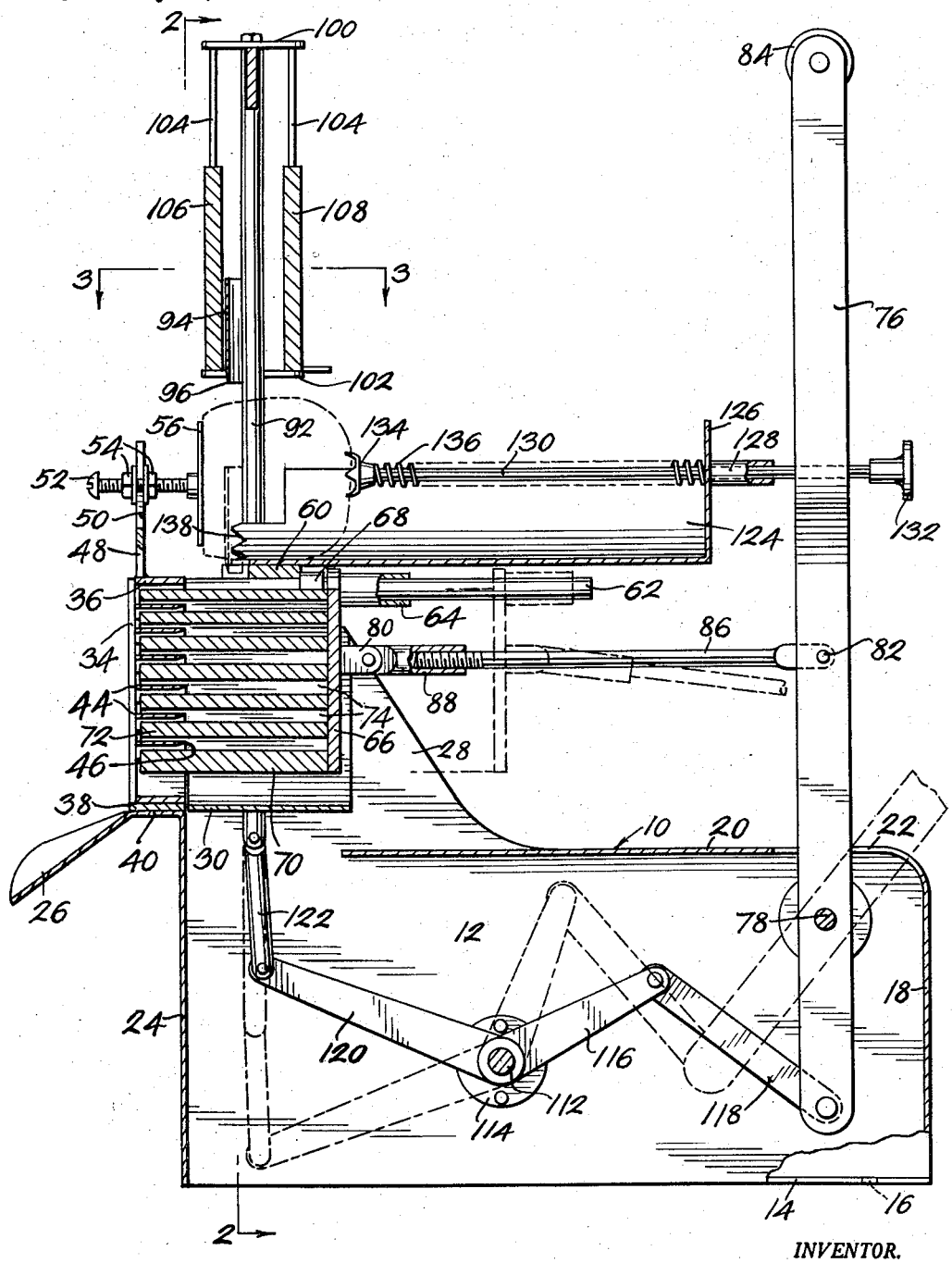
Figure 1 is a side elevation, partly in section, showing the fruit and vegetable slicing machine of the present invention.

With particular reference now to Figures 1 and 2 of the drawing, it will be seen that the base, indicated in a general way by numeral 10, includes spaced parallel side plates 12, having outturned flanges 14 along the lower edges which contain apertures 16 for fastening the unit to a suitable support (not shown), a rear wall 18 and integrally formed top wall 20 having an opening 22 therein, and a front wall 24 having a discharge chute 26 formed along the upper edge thereof. The top wall 20 terminates short of front wall 24 and the side plates 12 are provided with extensions 28 along the front edges thereof and above the top wall. A V-shaped trough 30 is positioned and supported between extensions 28 of the side plates.

Referring now to Figures 3 and 4 it will be seen that the side plate extensions 28 are formed to provide outturned flanges 32 along the forward edges thereof to which are bolted track elements 34 that provide retaining means to receive horizontal cutter 36. The track elements are joined and closed across the bottom by plate 38 which rests upon the horizontal section 40 of the chute 26 and provides a support for cutter 36. The upper ends of the track elements are open so that the cutter 36 can be raised and lowered therein relative to the trough 30 and removed for cleaning. The track elements also restrain the horizontal cutter against forward movement.

In Figures 1 and 5, the horizontal cutter 36 will be seen to comprise a generally rectangular frame 42 having a plurality of vertically spaced, substantially parallel corrugated blades 44 extending between the sides of the frame. In this connection it is to be noted that the present invention is not limited to the specific blade design illustrated as many other conventional blade designs could also be used although the one shown constitutes the preferred embodiment of the invention. The rear edges 46 of the blades are sharpened to a knife edge as shown in Figure 1. A tongue 48 having an upwardly opening notch 50 is attached to the upper edge of the frame between the sides thereof. A threaded fastener 52 is mounted within the notch 50 and nuts 54 which lap the tongue enable the fastener to be adjusted and fastened in a plurality of selected vertical and horizontal positions. The rear end of the fastener is provided with a retaining plate 56 which determines the thickness of the initial slice in a manner which will be described more fully hereinafter.

The upper ends of the track elements 34 are bent rearwardly to provide horizontal supporting flanges 58 shown in Figures 2, 3 and 4. A transverse bed plate 60 is welded or otherwise permanently attached between the supporting flanges in position to overlie the trough 30 but spaced rearwardly from the knife edges 46 of cutter 36. The front ends of rearwardly extending horizontal guide rods 62 are attached to the underside of the bed plate 60 adjacent flanges 58 and arranged in spaced parallel relation. Sleeves 64 are mounted upon the guide rods 62 for forward and rearward reciprocation relative to the cutter 36. A transverse triangular plate 66 is rigidly attached to sleeve 64 in position to extend downwardly therefrom and move back and forth within trough 30. Stops 68 are mounted on rods 62 to limit the forward movement of the sleeves 64 and, therefore, plate 66 suspended therefrom.

Referring again to Figures 1 and 2, plate 66 carries a plunger 70 attached to the front face thereof and sized to pass through the trough 30. The plunger is formed in vertically spaced sections 72 separated by transverse slots 74 shaped to receive blades 46 while said spaced sections pass therebetween. A slice of a vegetable positioned against the knife edges 46 of the horizontal cutter 36 with the plunger 70 in the retracted position indicated by dotted lines in Figure 1, will be forced through the cutter and sliced into a plurality of elongated sections having scalloped or wavy upper and lower surfaces when said plunger is moved forwardly into the full line position. As the plunger sections 72 move between the blades they also force the severed vegetable or fruit sections between the track elements and onto the discharge chute 26.

In Figure 1 it will be seen that an operating handle 76 is mounted on a transverse rod 78 extending between the side plates 12 for pivotal movement backward and forward about a point spaced from the lower end thereof. The operating handle projects upwardly through opening 22 in the top wall 20 of the base which is sized to permit movement of said handle between the full and dotted line positions. A clevis 80 is attached to the rear face of plate 66 and a pivot pin 82 is mounted on the handle between rod 78 and grip 84 on the upper end thereof. Link 86 having a threaded connector 88 pivotally attached to the clevis and the other end attached to pin 82 forms an operative connection between the handle 76 and the plunger to effect reciprocating movement thereof.

The vertical cutter assembly will now be described in connection with Figures 1 through 4, inclusive. Vertical sleeves 90 are arranged in spaced parallel relation on the underside of bed plate which is provided with apertures (not shown) to receive parallel vertical guide rods 92 for upward and downward reciprocating movement within said sleeves. Near the upper ends of the vertical guide rods is positioned a vertical cutter blade 94 having a corrugated or sawtooth cross section which extends between said guide rods. The lower edge of the cutter blade 94 is provided with a knife edge 96 that can be seen in Figure 1. The position of the vertical cutter blade relative to the horizontal cutter 36 and plunger 70 is such that it will reciprocate in a substantially vertical plane passing between said horizontal cutter and plunger when said plunger is in the retracted position shown by dotted lines in Figure 1 although it will be stopped as it contacts the upper surface of the bed plate 60 before it actually moves therebetween. The bed plate 60 is cut away at 98 beneath the vertical cutter as will be clearly seen in Figure 3. The vertical rods 92 are each provided with upper and lower brackets 100 and 102, respectively, which project forwardly and rearwardly therefrom at the top and at a point adjacent the lower extremity of the cutter blade. Counterweight guide rods 104 extend between the upper and lower brackets in spaced parallel relation to one another and to rods 92 at the front and rear thereof. Front and rear counterweights 106 and 108, respectively, are mounted on guide rods 104 for upward and downward slidable movement relative to vertical cutter blade 94. These counterweights are preferably notched at 110 along the upper side edges thereof to permit them to rise above the upper end of rods 92. The front counterweight lies immediately in front of the cutter blade 94 and acts to force a vegetable or fruit slice severed thereby into the space between the horizontal cutter and plunger as will be described in somewhat greater detail hereinafter.

Upward and downward reciprocation of the rods 92 and the vertical cutter blade can best be described with reference to Figures 1 and 2. A transverse shaft 112 extends between the side plates 12 forward of transverse rod 78 where it is journaled for rotational movement within bearings 114 affixed to said side plates. The shaft is provided with a central arm 116 rigidly attached thereto and extending rearwardly in the direction of the operating handle 76. The lower extremity of the operating handle and the rear end of the central arm are pivotally interconnected by a link 118 shown in Figure 1. Side arms 120 are fixedly attached to the shaft adjacent the ends thereof and extend forwardly; whereupon, the front ends are pivotally interconnected with the lower ends of rods 92 by links 122. Thus, it will be seen in Figure 1 that movement of the operating handle 76 from the full line position to the dotted line position will function through link 118 and central arm 116 to rotate shaft 112 counterclockwise and pull rods 92 downwardly by reason of the pivotal connection between the side arms 120, links 122 and said rods. This, of course, moves the vertical cutter blade 94 down into the dotted line position. The same rearward movement of the handle retracts the plunger 70 from the horizontal cutter blade 36 and provides a space therebetween to receive the slice of vegetable or fruit severed by the downward stroke of the vertical cutter. Forward movement of the operating handle, on the other hand, raises the vertical cutter and moves the plunger between the blades of the horizontal cutter.

Again referring to Figures 1 through 4, inclusive, it can be seen that a feed chute 124 is mounted on bed plate 60 and extends rearwardly therefrom along approximately the longitudinal center line of the machine. The feed chute is generally shaped like a trough and has a rear end wall 126 to which is attached a fitting 128 that receives a feed plunger 130 for forward and rearward reciprocal movement within the chute. The feed plunger is provided with a knob 132 at the rear end and toothed element 134 at the front end. A compression spring 136 is mounted on the plunger between wall 126 of the chute and the toothed element and functions to urge said plunger forwardly to a point where the teeth of the toothed element engage a vegetable or fruit (shown in dotted lines within the forward end of the chute) and press it against the plate 56. The front edge 138 of the feed chute is sawtoothed or corrugated in a manner to pass the vertical cutter blade 94 as shown most clearly in Figure 3.

*Operation*

In order to operate the slicing machine of the present invention, the feed plunger 130 is retracted by means of knob 132 against the action of compression spring 136 and a vegetable or fruit, a potato for example, is placed in the feed chute 124. Upon release of the plunger, the toothed element 134 will engage the rear of the potato and urge it forwardly against plate 56. The plate may, of course, be adjusted vertically by fastener 52 until it engages approximately the center of the potato and longitudinally to set the thickness of the slice. Starting with the operating handle 76 forward, it is pulled rearwardly to make the initial slice. As the handle is pulled back, it pivots on rod 78 and acts through link 118, central arm 116, side arms 120 and links 122 to pull down rods 92 which carry the vertical cutter blade 94 and pull it through the potato. This cutter blade passes behind plate 56 and in front of sawtooth edge 138 of the chute, as aforementioned. As the rods 92 move downward, the front and rear counterweights 106 and 108 move downward also until they engage the top of the potato; whereupon, they stop and the vertical cutter continues its downward movement passing from its position therebetween.

At the same time, the operating handle is acting through link 86, clevis 80 and plate 66 to slide the sleeves 64 rearward away from stops 68 along rods 62 thereby retracting the plunger 70 from between the blades 44 of the horizontal cutter and forming a space therebetween to receive the slice severed by the vertical cutter blade. The front counterweight 106 is at the top of rods 104 resting on the slice being severed and as soon as said slice is cut free, the front counterweight moves downwardly along rods 104 and pushes the slice between the horizontal cutter and plunger 70 until it rests in trough 30. The rear counterweight 108 still rests on the top of the potato and is positioned at the top of rods 104. Note that the vertical cutter at the bottom of its stroke functions to replace plate 56 and prevent the feed plunger from moving the potato forwardly against the front counterweight which must drop freely between said cutter and plate as it moves the severed slice into trough 30.

The second phase of the cutting cycle takes place when the operating handle is moved forwardly or, in other words, returned to its original position. At this point it should be mentioned that the first slice severed will have only one corrugated or wavy face produced by the vertical cutter; however, each succeeding slice will have both the front and rear faces thereof corrugated. Such a slice will lie in the trough 30 between plunger 70 and the horizontal cutter at the beginning of the return stroke of the operating handle.

As the handle is pushed forwardly, it acts to push plunger 70 against the once-cut slice and force it against and through the blades 44 of the horizontal cutter 36. The sections 72 of the plunger push the sections of the slice between the blades, and out onto discharge chute 26. Forward movement of the plunger is limited by sleeves 64 engaging stops 68 on rods 62. Thus, return of the operating handle to its original position cuts the severed slice into a plurality of elongated sections each having at least three corrugated faces.

During the forward movement of the handle, it is also functioning to lift rods 92, cutter blade 94 and front counterweight 106 which again rests upon lower brackets 102. The rear counterweight 108, however, still rests on top of the remainder of the potato and functions to maintain it in the feed chute in opposition to the frictional force tending to raise it as the cutter blade slides upwardly along the face thereof. As soon as the cutter blade is free of the potato, said cutter having protected the front counterweight therefrom as they both are raised, the rear counterweight is lifted free when it is picked up by brackets 102. The feed plunger is now free to urge the remainder of the potato forward against plate 56 under the action of the compression spring preparatory to making another cutting or slicing cycle.

Following use, the horizontal cutter can be lifted free of the tracks and cleaned. The vertical cutter can be cleaned without removal from the machine by merely raising the counterweights.

Having thus described the several useful and novel features of the slicing machine of the present invention in connection with the accompanying drawing, it will be apparent that the many useful objects for which it was designed have been achieved. I realize, however, that although only one specific form of the invention has been illustrated, certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. In a slicing machine, a base having side plates and a trough formed therebetween together forming a frame, at least one stationary blade positioned at the forward end of the trough, a plunger mounted within the trough for forward and rearward reciprocal movement relative to the stationary blade, the plunger having at least one slot in the forward end thereof positioned to receive the stationary blade when in forward position, the rear position of the plunger providing a gap between it and the stationary blade, a feed chute supported above the trough with its forward end terminating behind the stationary blade, sleeves supported on the frame in spaced parallel relation and extending upwardly therefrom, parallel rods mounted within the sleeves for upward and downward slidable movement, a movable blade mounted between the rods for reciprocal movement therewith across the forward end of the chute, an operating lever mounted between the side plates for forward and rearward pivotal movement about a point located between the ends thereof, link means pivotally interconnecting the lever at a point above the pivot with the plunger, rearward movement of the lever acting through the link to retract the plunger from the stationary blade and forward movement thereof functioning to push the plunger into position to receive the stationary blade, bell crank means journaled for rockable movement between the side plates forward of the operating lever, link means pivotally interconnecting the operating lever at a point below the pivot with the rear end of the bell crank means, link means pivotally interconnecting the front end of the bell crank means with the movable blade, rearward movement of the operating lever acting through the bell crank means and associated link means to lower the movable blade across the chute and sever a slice from a vegetable projecting therefrom while the plunger is being retracted, and a counterweight carried by said parallel rods for upward and downward relative movement in front of the movable blade, the counterweight being positioned to rest upon the portion of the vegetable projecting beyond the chute and force said portion when severed by the movable blade into the gap between the plunger and the fixed blade, and forward movement of the operating lever acting to raise the movable blade while pushing the plunger and severed slice against the stationary blade to cut the slice into sections.

2. A device in accordance with claim 1 in which the stationary blade extends laterally across the forward end of the trough.

3. A device in accordance with claim 1 in which a plurality of stationary blades are arranged in the forward end of the chute in spaced substantially parallel relationship and the forward end of the plunger is provided with a slot positioned to receive each of the stationary blades.

4. A device in accordance with claim 1 in which means comprising a stop is positioned forward of the chute in spaced relation thereto, said stop functioning to determine the thickness of the slice severed by the movable blade.

5. A device in accordance with claim 2 in which the stationary blade has a corugated lateral cross section.

6. A device in accordance with claim 3 in which the stationary blades extend transversely across the forward end of the chute, each of said blades has a corrugated transverse section, and the slots in the plunger are corrugated to receive the blades.

7. A device in accordance with claim 4 in which adjustable means interconects the stop and the stationary blade, said means providing for adjustment of said stop longitudinally to vary the thickness of the slice severed by the movable blade.

8. A device in accordance with claim 6 in which the movable blade is corrugated.

9. A device in accordance with claim 1 in which a second counterweight is carried by the vertical rods for upward and downward movement relative to the movable blade at the rear thereof, the second counterweight being positioned to rest upon the portion of a vegetable lying in the chute and preventing said portion from raising as the movable blade is lifted after a slice is severed.

10. A device in accordance with claim 7 in which the adjustable means provides for vertical adjustment of the stop relative to the forward end of the chute.

11. A device in accordance with claim 8 in which the stationary blades are enclosed in a frame open at the front and rear, the open front receiving the plunger when in forward position and the open rear passing the sections of the slice cut by the stationary blades therethrough.

12. A device in accordance with claim 9 in which a plurality of stationary blades extend transversely across the forward end of the trough in vertically spaced parallel relation.

13. A device in accordance with claim 12 in which the stationary blades are corrugated.

14. A device in accordance with claim 13 in which the movable blade is corrugated.

15. A device in accordance with claim 14 in which a stop is positioned in spaced relation in front of the chute to limit the thickness of the slice severed by the movable blade and a spring-pressed plunger is mounted within the chute for urging a vegetable therein against the stop.

16. In a slicing machine, a base having side plates and a trough formed therebetween together forming a frame, at least one stationary blade positioned at the forward end of the trough, longitudinally extending rods supported on the frame in spaced parallel relation, a sleeve mounted on each rod for slidable movement, a transverse plate supported between the sleeves, a plunger mounted on the forward face of the plate within the trough for forward and rearward reciprocal movement relative to the stationary blade, the plunger having at least one slot in the forward end thereof positioned to receive the stationary blade when in forward position, the rear position of the plunger providing a gap between it and the stationary blade, a feed chute supported above the trough with its forward end terminating behind the stationary blade, vertically extending spaced parallel sleeves mounted on the frame, a vertical rod mounted for slidable movement in each vertical sleeve, a movable blade mounted between the vertical rods for upward and downward reciprocal movement across the forward end of the chute, an operating lever mounted between the side plates for forward and rearward pivotal movement about a point located between the ends thereof, link means pivotally interconnecting the lever at a point above the pivot with the plunger, rearward movement of the lever acting through the link to retract the plunger from the stationary blade and forward movement thereof functioning to push the plunger into position to receive the stationary blade, bell crank means journaled for rockable movement between the side plates forward of the operating lever, link means pivotally interconnecting the operating lever at a point below the pivot with the rear end of the bell crank means, link means pivotally interconnecting the front end of the bell crank means with the movable blade, rearward movement of the operating lever acting through the bell crank means and associated link means to lower the movable blade across the chute and sever a slice from a vegetable projecting therefrom while the plunger is being retracted, and a counterweight carried by said vertical rods for upward and downward relative movement in front of the movable blade, the counterweight being positioned to rest upon the portion of the vegetable projecting beyond the chute and force said portion when severed by the movable blade into the gap between the plunger and the fixed blade and forward movement of the operating lever acting to raise the movable blade while pushing the plunger and severed slice against the stationary blade to cut the slice into sections.

17. A device in accordance with claim 16 in which the stationary blade extends laterally across the forward end of the trough.

18. A device in accordance with claim 16 in which a plurality of stationary blades are arranged in the forward end of the chute in spaced substantially parallel relationship and the forward end of the plunger is provided with a slot positioned to receive each of the stationary blades.

19. A device in accordance with claim 16 in which means comprising a stop is positioned forward of the chute in spaced relation thereto, said stop functioning to determine the thickness of the slice severed by the movable blade.

20. A device in accordance with claim 17 in which the stationary blade has a corrugated cross section.

References Cited in the file of this patent

UNITED STATES PATENTS

| | | |
|---|---|---|
| 1,046,551 | Cass | Dec. 10, 1912 |
| 2,303,595 | Young | Dec. 1, 1942 |

FOREIGN PATENTS

| | | |
|---|---|---|
| 91,626 | Sweden | Mar. 3, 1938 |